Feb. 6, 1968  G. E. WILCOX  3,368,074
SOLID STATE NUCLEAR DETECTOR
Filed Feb. 26, 1965

INVENTOR.
GEORGE E. WILCOX
BY
ATTORNEYS

United States Patent Office 3,368,074
Patented Feb. 6, 1968

3,368,074
SOLID STATE NUCLEAR DETECTOR
George E. Wilcox, Doylestown, Pa., assignor to the United States of America as represented by the Secretary of the Navy
Filed Feb. 26, 1965, Ser. No. 435,758
12 Claims. (Cl. 250—71.5)

ABSTRACT OF THE DISCLOSURE

A detector for measuring various types of nuclear radiation and including both a pair of photoconductive cells each activated by a common light source and a normally balanced difference amplifier whose output signal is monitored by a meter. In the presence of radiation, a scintillation crystal emits light energy of corresponding intensity which is directed to one of the photoconductive cells and causes the difference amplifier to provide the output signal.

---

Figure 1:
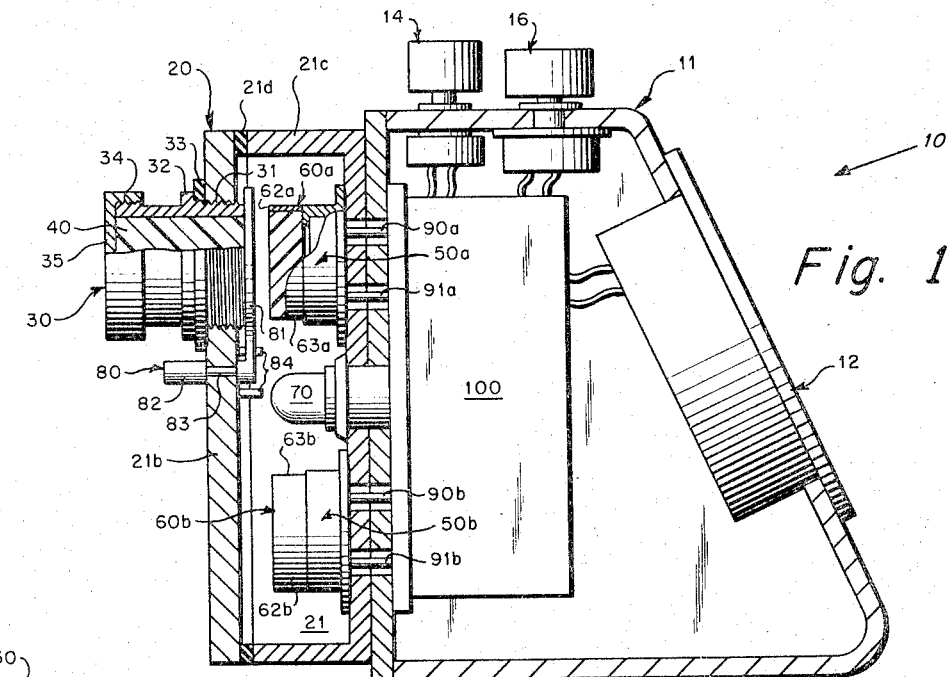

The invention described herein may be manufactured and used by or for the Government of the United States of America for governmental purposes without the payment of any royalties thereon or therefor.

The present invention relates to nuclear radiation detection and more particularly to a solid state nuclear radiation detector.

Nuclear ratemeters of the portable survey type fall into four general classifications with respect to the detector used: Geiger-Müller, proportional, semi-conductor and scintillation. Geiger-Müller tubes are limited to beta and gamma radiation, saturate at higher intensities, and require a high voltage power supply. Proportional counters for beta and gamma radiation utilize ionization chambers which are relatively insensitive to lower energy radiation and intensities, while proportional counters for neutrons require specialized boron trifluoride detectors. Semiconductor or "solid state" detectors, although effective in detecting particulate radiation, are somewhat inefficient for gamma radiation and have not become common in portable survey meters. The scintillation detector is the most efficient and versatile of those mentioned above. In this device a scintillation phosphor or crystal converts into light emission some fraction of the energy lost when nuclear radiation passes through the material. A photomultiplier tube is normally used to convert the light energy into electrical energy. The photomultiplier tube consists of a cylindrical glass envelope surrounding an electrode system called the dynodes. The top surface of the cylindrical glass envelope is the end window and on the inner surface thereof is deposited a light sensing photocathode. Light incident on the photocathode causes it to emit photoelectrons, which are then focused and accelerated to the dynode system. The dynode system serves to amplify the electronic impulses to a degree sufficient for recording on a suitable registering device. The resultant system requires a well regulated high voltage supply and the instruments are complex, expensive, susceptible to mechanical damage and to the influence of electrostatic and electromagnetic fields.

An object of the present invention is the provision of a simple, inexpensive, versatile ratemeter for the measurement of various types of nuclear radiation.

Another object is to provide a nuclear ratemeter which obtains the efficiency and versatility of a scintillation detector and the simplicity and low current drain of a solid state device.

A further object of the invention is the provision of a nuclear ratemeter which unlike the Geiger counter is not limited to beta and gamma radiation, will not saturate at high intensities, and requires no high voltage supply.

Still another object is to provide a nuclear ratemeter which is sensitive to a much wider range of energies and intensities than the ionization chamber or the semi-conductor detector.

Yet another object of the present invention is the provision of a nuclear ratemeter which has the capabilities of a scintillator detector without the complexity and cost of the photomultiplier tube usually associated with scintillation crystals.

A still further object is to provide a nuclear ratemeter which is simple, inexpensive and not readily susceptible to electrical and mechanical breakdown in a mobile environment.

Various other objects and advantage will appear from the following description of an embodiment of the invention, and the novel features will be particularly pointed out hereinafter in connection with the appended claims.

Figure 2:
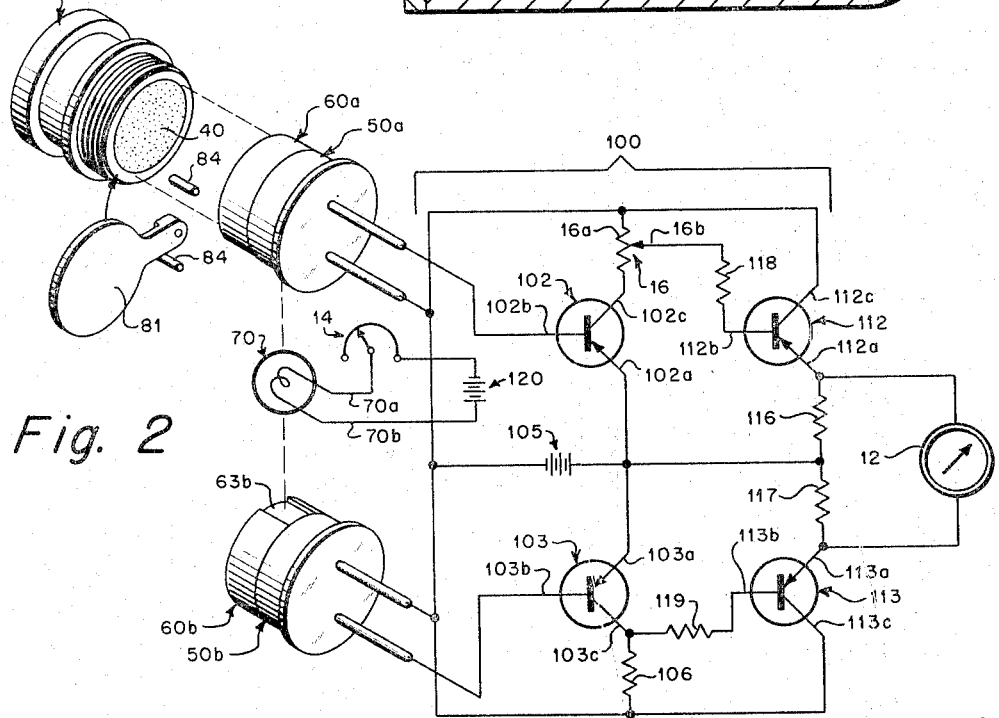

In the drawing:

FIG. 1 is a side view partially in cross section illustrating an embodiment of the present invention; and FIG. 2 is an isometric view of some of the elements of FIG. 1 and a schematic representation of the electronic circuitry forming part of the structure of FIG. 1.

As illustrated in the embodiment of FIG. 1, the novel nuclear radiation detector or ratemeter generally indicated at 10 includes a chassis 11 having a meter 12 appropriately secured thereto. A combination ON-OFF switch and rheostat 14 and potentiometer 16 are conveniently attached to the meter case 11 for selective manual adjustment and the operation thereof will be more fully discussed below.

A novel detector head forming a part of the ratemeter 10 and generally indicated at 20 is appropriately secured to the rear of meter case 11. Detector head 20 is a light-tight enclosure and includes a casing 21 having a rear wall 21a secured to the meter case 11 and a front wall 21b laterally spaced therefrom by sidewalls 21c and between which exists a neoprene seal 21d. A cylindrical boss member 30 is externally threaded at 31 for threadably engaging the front wall 21b of casing 21 and a flange 32 thereon cooperates with a washer 33 (neoprene) when the boss is threaded onto the wall 21b to form a light-tight connection. The outer end of the boss 30 is externally threaded at 34 for receiving a protective cap 35 constructed of a material which permits passage of radiation therethrough. A scintillation crystal 40 is removably housed within the confines of the boss 30 and may be of any appropriate material such as a cesium iodide phosphor activated with thallium and acts as a transducer to convert the energy of any incident radiation into a minute light signal.

Within the light-tight enclosure of the detector head 20 is a pair of matched photoconductive cells 50a and 50b which are spaced from each other and appropriately secured to the rear wall 21a of the casing 21. The photoconductive cell is of the commercial type known and used in the art; it is a light sensitive device for measuring the intensity of incident light and provides a resistance proportional to the intensity of light received by the cell. Such a photoconductive cell may be constructed of cadmium sulphide or the like.

The photoconductive cell 50a is in axial alignment with scintillating crystal 40 in order to receive the light energy emanating therefrom when a scintillation occurs. A pair of light pipes 60a and 60b are optically coupled to photoconductive cells 50a and 50b, respectively, with light pipe 60a in axial alignment with the crystal 40 and the photoconductive cell 50a. Light pipe 60a has the edges thereof coated with an opaque material 62a except for a window portion 63a which faces toward a lamp 70, such as a neon lamp, located equidistant from the two light pipes 60a and 60b. Similarly, light pipe 60b has the edges thereof coated with an opaque material 62b except for a window portion 63b which faces toward the neon lamp 70.

In order to preclude external signals from entering the light-tight interior of detector head 20 during a balancing operation, to be discussed below, a shutter device generally noted at 80 is provided on the casing 21 and includes a flat cover portion 81 for covering the scintillation crystal 40 and a control knob 82 which extends transversely through an aperture 83 within the front wall 21b of the detector casing 21. Stop members 84 are formed on the front wall 21b to appropriately position the shutter mechanism 80 in response to manual operation of the knob 82.

Photoconductive cell 50a is connected through conductors 90a and 91a, which pass through apertures in the detector head 20 and meter case 11, to electronic circuitry generally indicated at 100 and more fully described below with reference to FIG. 2. Similarly, photoconductor 50b is connected through conductors 90b and 91b to electronic circuitry 100 and conductors 70a and 70b likewise connect lamp 70 thereto.

The electronic circuit 100 which is in effect a difference amplifier includes a pair of transistors 102 and 103 having their respective emitter electrodes 102a and 102b connected to the positive terminal of battery 105. The base electrode 102b of transistor 102 is connected through photoconductive cell 50a which acts as a variable resistance, to the negative terminal of battery 105 while the base electrode 103b of transistor 103 is electrically connected through photoconductive cell 50b, which also acts as a variable resistance, to the negative terminal of battery 105. Collector electrode 102c of transistor 102 is coupled through resistance 16a of potentiometer 16 to the negative terminal of battery 105 while collector electrode 103c of transistor 103 is coupled through resistor 106 to the negative terminal of battery 105. The difference amplifier 100 further includes transistors 112 and 113 which in turn have their emitter electrodes 112a and 113a, respectively, electrically coupled to the positive terminal of battery 105 through resistors 116 and 117, respectively. Meter 12 in turn is connected between the emitter electrodes 112a and 113a. Collector electrodes 112c and 113c of transistors 112 and 113, respectively, are connected to the negative terminal of battery 105 while the base electrode 112b is connected through resistor 118 to the wiper arm 16b of potentiometer 16 and the base electrode 113b of transistor 113 is coupled through resistor 119 to the collector 103c of transistor 103.

Again with reference to FIG. 2, neon bias lamp 70 is connected to battery 120 through rheostat 14 which turns on the neon lamp and regulates the intensity of light emitted therefrom. It should be understood that rheostat 14 may be alternatively and appropriately connected to difference amplifier circuit 100 to control the on-off operation thereof.

In operation, and with particular reference to FIGS. 1 and 2, the shutter mechanism 80 is positioned between the scintillator crystal 40 and the light pipe 60a to exclude scintillations caused by external radiation from entering the light-tight chamber of detector head 20. The neon lamp is then turned on by rheostat 14 and the light emanating therefrom passes through the windows 63a and 63b in the light pipes 60a and 60b, respectively. This constant light excitation is sensed by the photoconductors 50a and 50b and drives the same into a more responsive region thereby improving the rise time by several orders of magnitude, it being understood that photoconductors are most efficient at high intensities of light. Since photoconductive cells 50a and 50b are matched and since bias lamp 70 is equidistant from the light pipes associated with the former, the outputs of the photoconductive cells are approximately equal. However, in order to balance the currents in the legs of the difference amplifier circuit 100, potentiometer 16 is adjusted to a null, that is until the meter 12 reads zero.

When the shutter 80 is rotated to an open position and the detector is in a nuclear radiation environment the nuclear radiation that is to be detected and measured, passes through the cap 35 to the scintillation crystal 40. Some fraction of this radiation gives up its energy in the form of minute light flashes which pass through light pipe 60a onto the sensitive surface of only one photocell, that being 50a. The resistance of the cadmium sulphide layer in photoconductive cell 50a is proportional to the light incident to the material and therefore the aforesaid minute light flashes from the scintillator causes an increase in the current flowing from battery 105 through one leg of difference amplifier circuit 100. This unbalance in the circuit 100 produces a reading on the meter proportional to the intensity of the radiation present. While the response of this device is insufficient for the measurement of individual pulses such as is possible in the conventional scintillator, a detector is obtained which functions as an excellent ratemeter because of its inherent integrating characteristics.

It is readily seen that the screw cap 35 holds the crystal 40 in position and may be removed together with cylindrical member 30 to allow other types of scintillator phosphors to be substituted thereby conveniently converting the instrument to an alpha, beta, gamma or neutron detector. The cap 35 would be removed in the case of alpha detection to allow the particulate radiation to enter, a spring retainer being used to hold the crystal in place. The more efficient alpha scintillators which can be used are silver-activated, zinc-sulphide, anthracene, and stilbene. The anthracene and stilbene may also be used for beta detection as well as for gamma, but sodium iodide and cesium iodide are more efficient for gamma. Anthracene or lithium iodide crystals may be used for neutron detection. It should be noted that polystyrene or polyvinyltoluene is a readily available plastic scintillator which will detect all the above types of radiation, however, with greatly reduced efficiency and may be used if desired.

It is further understood that a multiscale meter and a switch to select range and type of radiation to be measured may be provided to enhance the diversity of capability of the detector 10. Furthermore, it is understood that the nuclear detection ratemeter of the present invention may be readily adapted to field use and remote use by permitting the quick and easy disassembly of the detector head 20 from the equipment housed within the casing 11 and by providing appropriate conductors between the equipments within the detector head and the casing which can be conveniently stored within the casing 11.

It will be understood that various changes in the details, materials, steps and arrangement of parts which have been herein described and illustrated in order to explain the nature of the invention may be made by those skilled in the art within the principle and scope of the invention as expressed in the appended claims.

I claim:

1. A radiation ratemeter for measuring the intensity of radiation present, comprising:
    first and second light sensing means each providing a resistance proportional to the intensity of light energy received,
    a light bias means providing steady state light bias energy equally to said first and second light sensing means,
    converting means optically positioned for providing to said first light sensing means light energy proportional to the intensity of radiation present, whereby the output of said first light sensing means is proportional to the sum of said steady state light bias energy and said light energy, and
    circuit means for subtracting the output of said second light sensing means from said first light sensing means whereby the resulting output is proportional to the intensity of the radiation present.

2. A radiation ratemeter for measuring the intensity of radiation present, comprising:

first and second light sensing means, each providing a resistance proportional to the intensity of light energy received, a light bias means providing steady state light bias energy to said first and second light sensing means, means optically positioned for providing to said first light sensing means light energy proportional to the intensity of radiation present, whereby the output of said first light sensing means is proportional to the sum of said light bias energy and said light energy, and circuit means for receiving and balancing the outputs of said first and second light sensing means resulting from said steady state light bias energy whereby any unbalance thereafter occurring is indicative of the intensity of radiation present.

3. The radiation ratemeter as defined in claim 2 wherein said first and second light sensing means are photoconductors.

4. The radiation ratemeter as defined in claim 3 wherein said light bias means is located equidistant from said first and second light sensing means.

5. The radiation ratemeter as defined in claim 4 wherein said light bias means is a neon lamp.

6. The radiation ratemeter as defined in claim 5 wherein said converting means is a scintillator.

7. The radiation ratemeter as defined in claim 6 wherein said scintillator is formed of sodium iodide.

8. The radiation ratemeter as defined in claim 7 wherein said photoconductive cells are constructed of cadmium sulphide.

9. A radiation ratemeter for measuring the intensity of radiation present comprising:

first and second light sensing means, each providing a resistance proportional to the intensity of light energy received, a light bias means providing steady state light bias energy to said first and second light sensing means, converting means optically positioned for providing to said first light sensing means light energy proportional to the intensity of radiation present, whereby the output of said first light sensing means is proportional to the sum of said light bias energy and said light energy, circuit means for receiving the outputs of said first and second light sensing means resulting from said steady state light bias energy whereby any unbalance thereafter occurring is indicative of the intensity of radiation present, and shutter means interposed between said converting means and said first light sensing means and operable between a closed position wherein said light energy from said converting means is not sensed by said first light sensing means and an open position wherein said light energy is received by said first light sensing means.

said shutter means being in the closed position when said circuit means balances the outputs of said first and second light sensing means.

10. The radiation ratemeter as defined in claim 9 wherein said circuit means includes a potentiometer for balancing the outputs of said first light means and said second light means resulting from the steady state light bias energy.

11. A radiation ratemeter for measuring the intensity of radiation present, comprising:

first and second light sensing means each providing a resistance proportional to the intensity of light energy received, means for applying a constant light excitation bias energy to each of said sensing means for driving them into a more responsive region, means optically positioned for providing to said first light sensing means light energy proportional to the intensity of radiation present, whereby the output of said first light sensing means is proportional to the sum of said constant light excitation bias energy and said light energy, and circuit means receiving the outputs of said first and second light sensing means and balancing the outputs of said first and second light sensing means due to said constant light excitation bias energy whereby any unbalance thereafter occurring is indicative of the intensity of radiation present.

12. A radiation ratemeter for measuring the intensity of radiation present, comprising:

first and second photoconductive cells each providing a resistance proportional to the intensity of light energy received, light biasing means located equidistant from said first and second photoconductive cells for applying a constant light excitation bias energy to each of said cells for driving them into a more responsive region, a scintillator optically positioned for providing to said first photoconductive cell light energy proportional to the intensity of radiation present whereby the output of said first photoconductive cell is proportional to the sum of said constant light excitation bias energy and said light energy, circuit means for receiving the outputs of said first and second photoconductive cells resulting from said constant light excitation bias energy whereby any unbalance thereafter occurring is indicative of the intensity of radiation present, and shutter means interposed between said scintillator and said first photoconductive cell and operable between a closed position wherein said light energy from said scintillator is not sensed by said first photoconductive cell and an open position wherein said light energy is received by said first photoconductive cell, said shutter means being in the closed position when said circuit means balances the output of said first and second photoconductive cells.

References Cited

UNITED STATES PATENTS

| | | | |
|---|---|---|---|
| 2,899,560 | 8/1959 | Nemet | 250—71.5 |
| 3,056,123 | 9/1962 | Shamos | 250—71.5 X |
| 3,179,801 | 4/1965 | Scherbatskoy | 250—71.5 |

ARCHIE R. BORCHELT, *Primary Examiner.*